United States Patent
Passov (10) Patent No.: US 12,260,319 B2
(45) Date of Patent: Mar. 25, 2025

(54) INTEGRATED CIRCUIT WITH HARDWARD CONVOLUTION NEURAL NETWORK UNITS FOR EFFICIENT EXPANSION PROCESSES

(71) Applicant: AUTOBRAINS TECHNOLOGIES LTD, Tel Aviv (IL)

(72) Inventor: Eli Passov, Hod Hasharon (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 928 days.

(21) Appl. No.: 17/301,612

(22) Filed: Apr. 8, 2021

(65) Prior Publication Data

US 2021/0319297 A1    Oct. 14, 2021

Related U.S. Application Data (60) Provisional application No. 63/006,821, filed on Apr. 8, 2020.

(51) Int. Cl.
  *G06N 3/063*   (2023.01)
  *G06N 3/04*    (2023.01)
  *G06N 3/045*   (2023.01)

(52) U.S. Cl.
  CPC .............. *G06N 3/063* (2013.01); *G06N 3/04* (2013.01); *G06N 3/045* (2023.01)

(58) Field of Classification Search
  None
  See application file for complete search history.

(56) References Cited

U.S. PATENT DOCUMENTS

| | | | | |
|---|---|---|---|---|
| 8,060,857  | B2 * | 11/2011 | Biggerstaff | G06F 8/76 717/136 |
| 8,225,277  | B2 * | 7/2012  | Biggerstaff | G06F 8/43 717/136 |
| 9,684,951  | B2 * | 6/2017  | Wohlberg    | H03M 7/00 |
| 10,984,245 | B1 * | 4/2021  | Tran        | G06F 18/2111 |
| 11,061,402 | B2 * | 7/2021  | Urtasun     | G01S 17/86 |
| 11,544,550 | B2 * | 1/2023  | Graham      | G06F 16/90335 |
| 11,556,777 | B2 * | 1/2023  | Wang        | G05D 1/249 |
| 2010/0199257 | A1 * | 8/2010 | Biggerstaff | G06F 8/456 717/110 |
| 2010/0205589 | A1 * | 8/2010 | Biggerstaff | G06F 8/43 717/150 |
| 2016/0335224 | A1 * | 11/2016 | Wohlberg   | G06T 5/75 |
| 2017/0213127 | A1 * | 7/2017  | Duncan     | G16B 50/30 |
| 2019/0146497 | A1 * | 5/2019  | Urtasun    | G06V 10/82 701/27 |
| 2019/0147335 | A1 * | 5/2019  | Wang       | G06F 18/251 706/20 |

* cited by examiner

*Primary Examiner* — Maikhanh Nguyen
(74) *Attorney, Agent, or Firm* — RECHES PATENTS (57) ABSTRACT

An integrated circuit with arrays of convolution units that include hardware convolution neural network units configured to perform efficient expansion process by parallelization. The integrated circuit includes multiple building blocks that include the arrays of convolution units, inputs, and outputs t.

13 Claims, 5 Drawing Sheets

INTEGRATED CIRCUIT WITH HARDWARE CONVOLUTION NEURAL NETWORK UNITS FOR EFFICIENT EXPANSION PROCESSES

BACKGROUND

One of the most common neural networks is a convolutional neural network (CNN). CNN requires extensive computational resources and may consume a lot of energy.

Grouped convolution involves virtually grouping different channels of information to provide groups, applying convolutional operations on each group and combining the results. The grouped convolution reduces the computational load associated with calculating convolutions between all channels to all other channels.

A basic building block of the grouped convolution includes virtually splitting the CNN to different sub-networks, each processes a group of channels. The virtual splitting and the following convolution operations are followed by combining the sub-networks.

The combining is executed by 1×1 convolutional network that have kernels that operate on one information unit (for example one pixel) at a time.

The 1×1 convolution unit may also assist in the expansion process—by increasing the number of filters (each filter may be applied by a 1×1 convolution unit).

Some legacy neural network processors, and/or some neural network processors that are required to support legacy neural network have array convolution units—for example 3×3 neural networks, 5×5 neural networks, and the like.

In such neural network processors it is highly inefficient to implement 1×1 convolutions using the array convolution units.

There is a growing need to provide an efficient convolutional neural network.

SUMMARY

There may be provided a method, system and computer readable medium for CNN and CNN processing.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The terms feature and channel are used in an intermediate manner. For example, an input image may include three channels—red, green and blue. Accordingly—the input image has three features.

Figure 1:
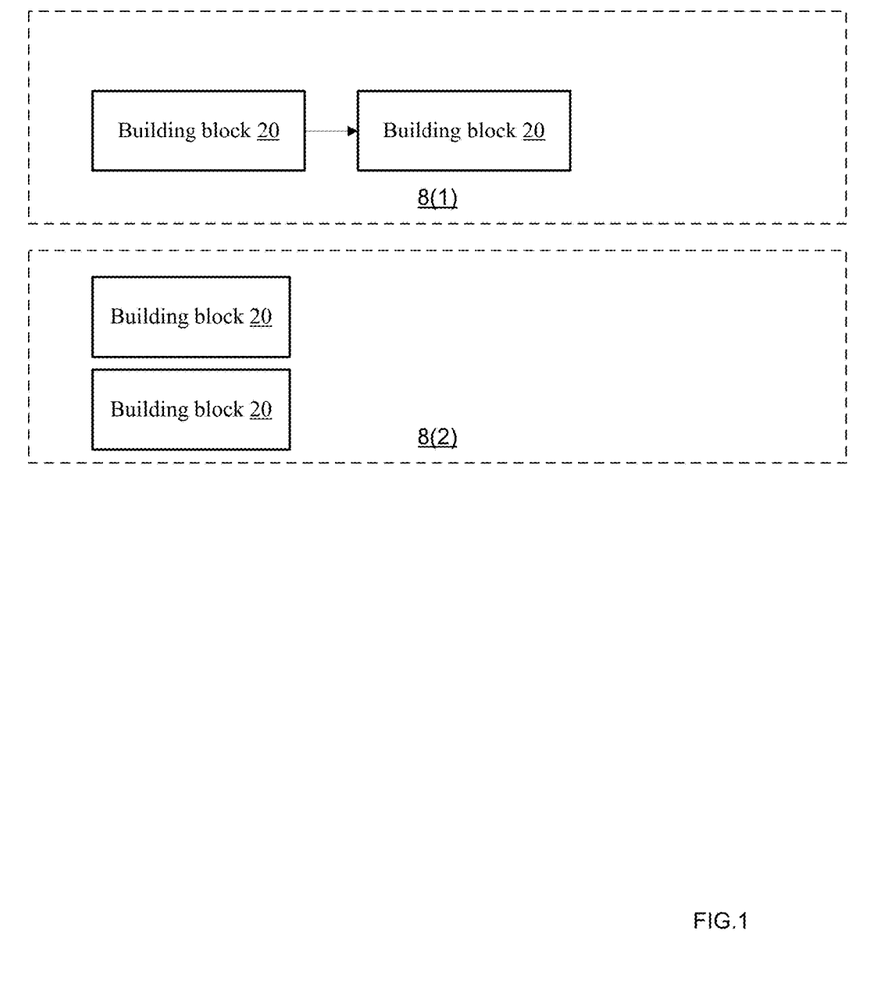
FIG. 1 illustrates examples of apparatuses.

There may be provided an apparatus that may include a neural network processor, the neural network processor may include multiple building blocks. FIG. 1 illustrates examples of various apparatuses 8(1) and 8(2) that include one or more building blocks 20. Apparatus 8(1) includes a sequence of a building block 20. Apparatus 8(2) illustrates building blocks 20 that are not serially connected to each other.

Figure 2:
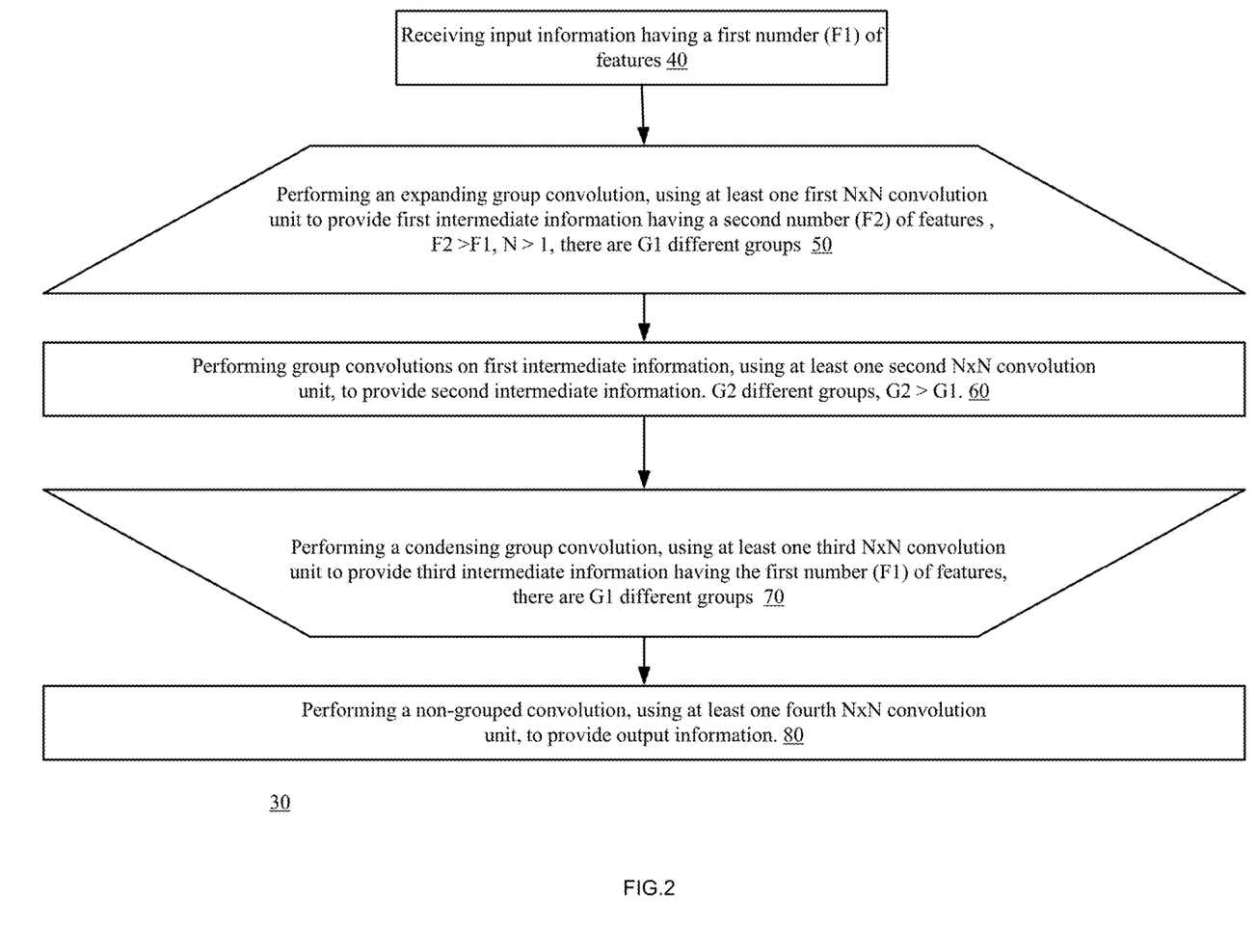
FIG. 2 illustrates an example of a method executed by a building block.

FIG. 2 illustrates a method 30 that may be executed by a building block 20. All of only some of the multiple building blocks of the apparatus may be building blocks such as building block 20.

The building block may include an input, one or more array convolution units and an output. An input may be an input port, a memory, a storage unit, a buffer, a stack, and the like. The same is applicable, mutatis mutandis, to the output.

Method 30 may include the following sequence of steps 40, 50, 60, 70, and 80.

The method 30 may be explained by referring to various positive integers that exceed one—first number (F1) of features, second number (F2) of features, first number (G1)

of first groups, second number (G2) of second groups, length and width (N) of a convolution unit.

Steps 50, 60, 70 and 80 use a N×N convolution unit.

There may be one or more N×N convolution units, and the different channels of a group and/or different groups may be processed in a serial and/or parallel manner Step 40 may include receiving input information having a first number (F1) of features. The input information may be sensed information or an output from a previous layer of a neural network.

Step 50 may include performing an expanding group convolution, using at least one first N×N convolution unit to provide first intermediate information. The first intermediate information (II1) has a second number (F2) of features. F2 exceeds F1. F2 may exceed F1 by a factor of at least 2, 3, 4, 5, 6, and the like.

The expanding group convolution is a group convolution that increases the number of features—from F1 to F2. The increment of the number of features are executed withing paying a high computational cost as then are grouped convolutions Step 60 may include performing group convolutions on first intermediate information, using at least one second N×N convolution unit, to provide second intermediate information (II2). The II2 are grouped to G2 different groups, whereas G2 exceeds G1. G2 may exceed G1 by a factor of at least 2, 3, 4, 5, 6, and the like. The group convolution may be a non-expanding process.

Step 60 may process many groups and thus may apply many different filters—especially in relation to the number of filters applied during steps 50 and 70.

Step 70 may include performing a condensing group convolution, using at least one third N×N convolution unit to provide third intermediate information. The third intermediate information (ID) has the first number (F1) of features. Step 70 is applied on G1 groups of II2.

Step 80 may include performing a non-grouped convolution, using at least one fourth N×N convolution unit, to provide output intermediate information. The non-grouped convolution is more computational extensive than the grouped convolution—but is applied on II3 that has fewer features than II2.

Figure 3:
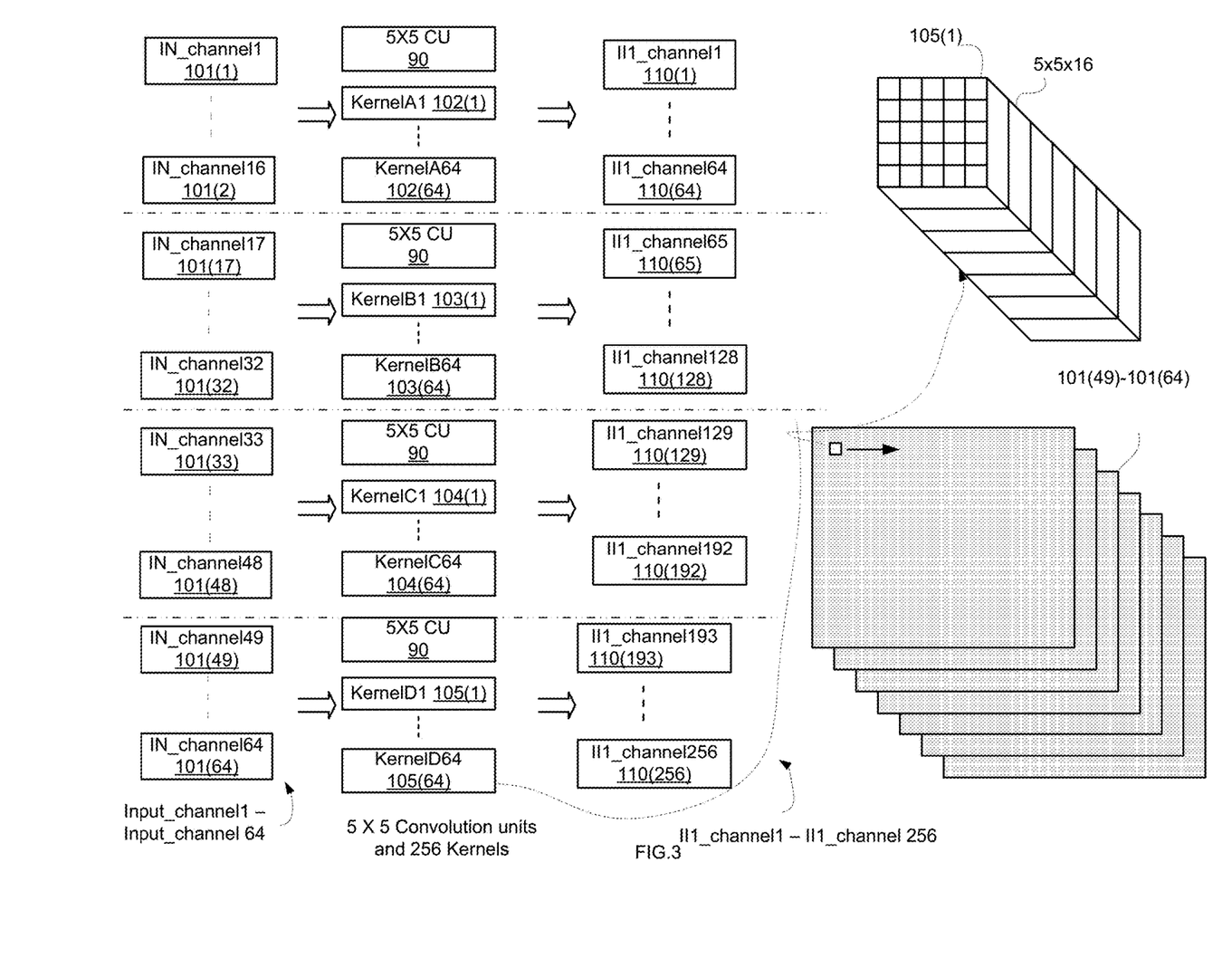
FIGS. 3-5 illustrate an example of information units and operations applied by the building block.
Figure 4:
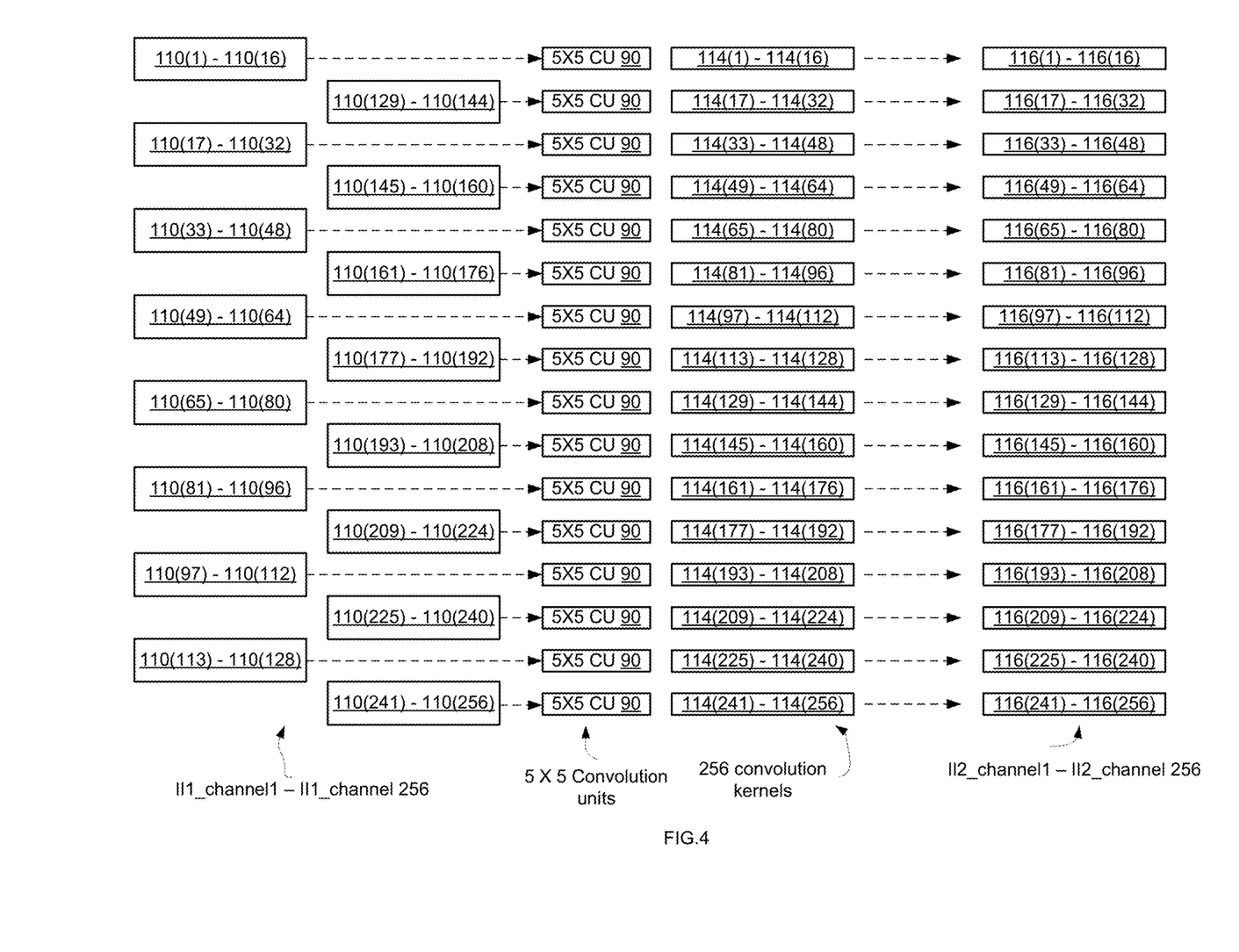
Figure 5:
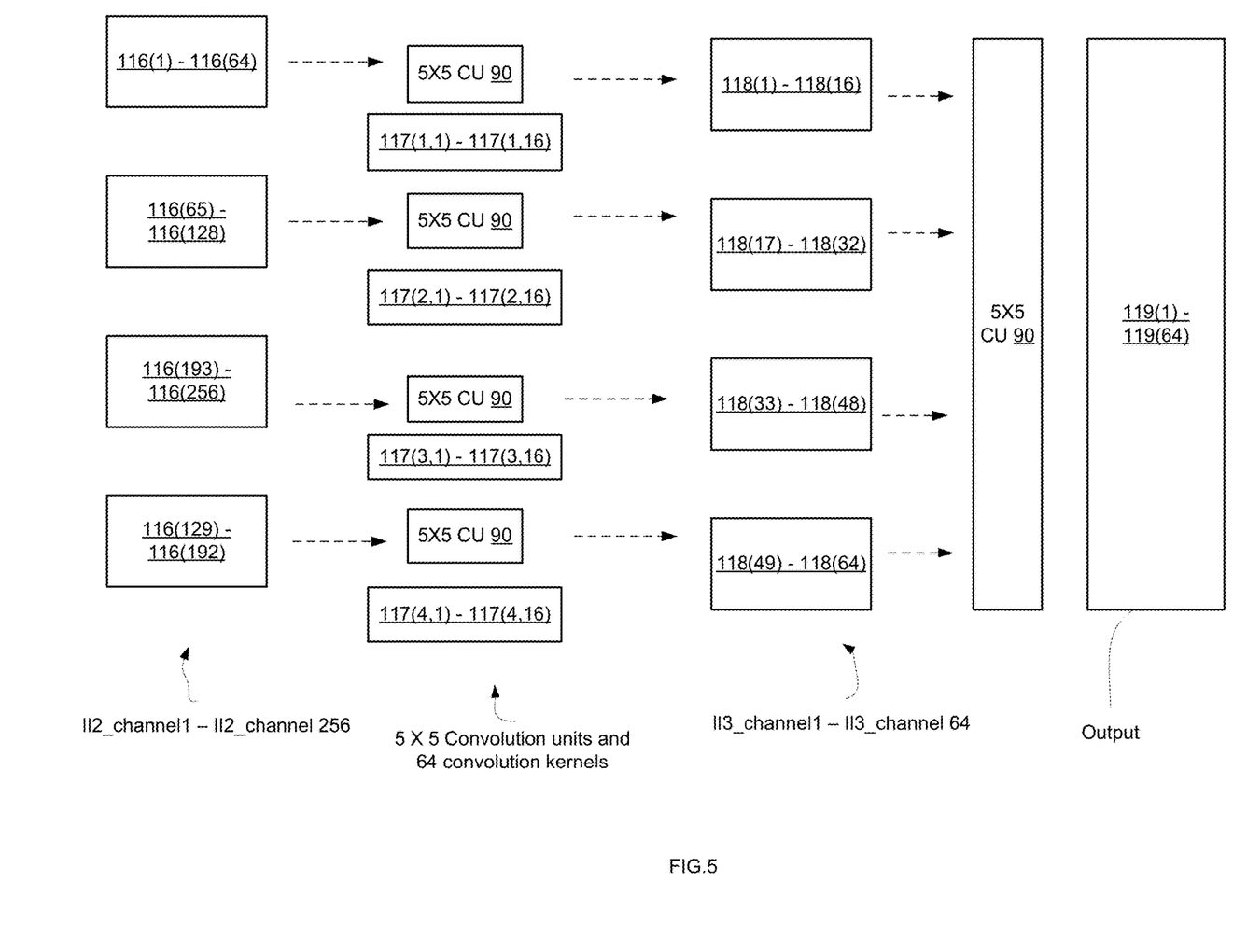

FIG. 3-5 illustrates information units and operations applied by the building block.

It is assumed that F1=64, G1=4, F2=256, G2=16, N=5.

Referring to FIG. 3—illustrating step 50.

The input information (received at step 40) includes sixty four channels IN_channel1-IN_channel64 101(1)-101(64), that are grouped to four groups—each including sixteen channels.

Each group of input information undergoes an expanding group convolution, using at least one 5×5 convolution unit (denoted 5×5 CU) to provide first intermediate information (II1) that has 256 channels: II1_channel1-II1_channel256 110(1)-110(256).

The 256 channels of II1 are virtually grouped to four groups—each including 64 channels.

The expansion of the channels is performed by applying a set of sixty four kernels by each one of the 5×5 convolution unit (denoted 5×5 CU). Different groups may be processed by different sets of kernels.

The first group of input channels is processed by a first set of kernels: KernelA1_KernelA64 102(1)-102(64). The second group of input channels is processed by a second set of kernels: KernelB1-KernelB64 103(1)-103(64). The third group of input channels is processed by a third set of kernels: KernelC1-KernelC64 104(1)-104(64). The fourth group of input channels is processed by a fourth set of kernels: KernelD1-KernelD64 105(1)-105(64).

FIG. 3 also illustrates an example of a five by five convolution.

A convolution may be characterized by a size of input data pixels it operated on. For example—a five by five convolution unit works as follows.

Assuming that a five by five convolution unit 90 receives sixteen input data channels (101(49)-101(64)) and outputs sixty four II1 channels (110(93)-110(256)). The output of 64 channels indicates that each group if processed by applying 64 different kernels (for example 105(1)-105(64)). Each kernel includes 5×5×16 elements.

Each convolutional kernel is applied on a three dimensional data structure that includes all of the channels of a group of input channels. Each convolutional kernel scans the data structure to provide an output related to a single output channel.

Referring to FIG. 4—illustrating step 60.

The 256 channels of II1 are virtually grouped to sixteen groups, each group includes sixteen channels and is processed by at least one 5×5 convolution unit 90 (by applying a 5×5×16 kernel) to provide sixteen groups of second intermediate information II2—each group of II2 includes sixteen channels—total of 256 channels 116(1)-116(256).

There are 16 sets of 16 kernels each—total of 256 sets of kernels 114(1)-114(256).

Referring to FIG. 5—illustrating steps 70 and 80.

In step 70—a condensing group convolution is applied on four groups of 112, using the at least one N×N convolution unit, to provide four groups of third intermediate information (II3)—each group of II3 channels includes 16 channels.

II2 are virtually grouped to four groups—each group includes 64 channels.

Each group of processed by 5×5 CU that applies a set of sixteen kernels—total of sixty four kernels 117(1,1)-117(1,16), 117(2,1)-117(2,16), 117(3,1)-117(3,16), and 117(4,1)-117(4,16).

The outcome of this step is third intermediate information II3 that is virtually grouped to four groups 118(1)-118(1), 118(17)-118(32), 118(33)-118(48) and 118(49)-118(64).

In step 80 all channels of II3 are processed by performing a non-grouped convolution, using the N×N convolution unit, to provide output information of sixty four channels 119(1)-119(64).

There may be any relationship between the number of any of the groups, the number of channels per each group, and the like.

The apparatus and method may be or may be implemented on integrated circuits that have a fixed five by five convolution units, that do not have a one to one convolution units, and that may support max-pooling only after convolution.

The neural network processor may include additional units such as at least one convolution unit that may be coupled between a pair of building blocks. The neural network processor may be an integrated circuit, may include more than a single integrated circuit, may be a part of an integrated circuit, may be a hardware accelerator, may be tailored to neural network processing, may be applied on a general purpose integrated circuit, may be applied on a graphic processor, and the like. The apparatus may be a computerized system, a part of a computerized system, may be a part of a laptop, desktop, a vehicle dedicated integrated circuit, and the like.

The apparatus and method may be applied on integrated circuits such as Renesas Electronics integrated circuits for vehicles.

Such integrated circuits, for example the Renesas integrated circuit exhibit a very low power consumption and are very popular among vehicle vendors.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. An integrated circuit that comprises:
a neural network processor comprising building blocks, each building block comprising an input and an output and executed by the neural network processor to:
receive, by an input of the building block, input information having a first number (F1) of features;
perform, by one or more first array convolution units of the building block, an expanding group convolution on the input information, to provide a first intermediate information, the first intermediate information having a second number (F2) of features, such that the second number of features exceeds the first number of features, and wherein the expanding group convolution applicable on a first plurality (G1) of groups of the input information;
perform, by one or more second array convolution units of the building block, a group convolution on the first intermediate information, to provide a second intermediate information, the group convolution applicable on a second plurality (G2) of groups of the first intermediate information, G2 exceeds G1;

perform, by one or more third array convolution units of the building block, a condensing group convolution on the second intermediate information, to provide third intermediate information, the group convolution applicable on a first plurality of groups of the input information; and perform, by one or more fourth array convolution units applied on the third intermediate information, a non-grouped convolution to provide output information; wherein a convolution unit of each of the first array convolution units, the second array convolution units, the third array convolution units and the fourth array convolution units are hardware convolution neural network units, wherein a ratio between the second plurality of groups of the first intermediate information and the first plurality of groups of the input information differ from a ratio between the second number of features of the first intermediate information and the first number of features of the input information, wherein each convolution units of the first array convolution units, the second array convolution units, the third array convolution units and the fourth array convolution units differs from a one by one hardware convolution neural network unit, and wherein the building block is further executed by the neural network processor to perform max-pooling operations, such that the max-pooling operations are performed only after convolution operations.

2. The integrated circuit according to claim 1, wherein at least a portion of the first array convolution units, the second array convolution units, the third array convolution units and the fourth array convolution units are five by five convolution units.

3. The integrated circuit according to claim 1, wherein at least two arrays of the first array convolution units, the second array convolution units, the third array convolution unit and the fourth array convolution unit are a same array of convolution units.

4. The integrated circuit according to claim 1, wherein at least one array of the first array convolution units, the second array convolution units, the third array convolution unit and the fourth array convolution unit differs from each other.

5. The integrated circuit according to claim 1, wherein a ratio between the second plurality of groups of the first intermediate information and the first plurality of groups of the input information equals a ratio between the second number of features of the first intermediate information and the first number of features of the input information.

6. A method of hardware group convolution expansion, the method executed by a neural network processor comprises:
receiving, by an input of a building block of the neural network processor, input information having a first number (F1) of features;
performing, by one or more first array convolution units of the building block, an expanding group convolution on the input information, to provide a first intermediate information, the first intermediate information having a second number (F2) of features, such that the second number (F2) of features exceeds the first number (F1) of features, and wherein the expanding group convolution is applicable on a first plurality (G1) of groups of the input information;

performing, by one or more second array convolution units of the building block, a group convolution on the first intermediate information, to provide a second intermediate information, the group convolution applicable on a second plurality (G2) of groups of the first intermediate information, such that G2 exceeds G1;

performing, by one or more third array convolution units of the building block, a condensing group convolution on the second intermediate information, to provide a third intermediate information, the group convolution is applied on a first plurality of groups of the second intermediate information; and performing, by one or more fourth array convolution units and on the third intermediate information, a non-grouped convolution to provide output information; wherein a convolution unit of each of the first array convolution units, the second array convolution units, the third array convolution units and the fourth array convolution unit are hardware convolution neural network units, wherein a ratio between the second plurality of groups of the first intermediate information and the first plurality of groups of the input information differ from a ratio between the second number of features of the first intermediate information and the first number of features of the input information, wherein each convolution units of the first array convolution units, the second array convolution units, the third array convolution units and the fourth array convolution units differs from a one by one hardware convolution neural network unit, and wherein the building block is further executed by the neural network processor to perform max-pooling operations, such that the max-pooling operations are performed only after convolution operations.

7. The method according to claim 6 wherein at least some of the first, second, third and fourth convolution units are five by five convolution units.

8. The method according to claim 6 wherein the first, second, third and fourth convolution units are the same at least one convolution units.

9. The method according to claim 6 wherein at least one of the first, second, third and fourth convolution units differ from each other.

10. The method according to claim 6 wherein a ratio between G2 and G1 differ from a ratio between F2 and F1.

11. The method according to claim 6 wherein a ratio between G2 and G1 equals a ratio between F2 and F1.

12. The method according to claim 6, wherein each of the first array convolution units, the second array convolution units, the third array convolution units and the fourth array convolution unit differs from a one by one hardware convolution neural network unit.

13. A non-transitory computer readable medium that stores instructions executable by a neural network processor of an integrated circuit for:
receiving, by an input of a building block of the integrated circuit, input information having a first number (F1) of features;
performing, by one or more first array convolution units of the building block being hardware convolution neural network units, an expanding group convolution on the input information, to provide a first intermediate information, the first intermediate information having a second number (F2) of features, such that the second number (F2) of features of the first intermediate information exceeds the first number (F1) of features of the input information, and wherein the expanding group convolution is applicable on a first plurality (G1) of groups of the input information;

performing, by one or more second array convolution units of the building block being hardware convolution neural network units, a group convolution on the first intermediate information, to provide a second intermediate information, the group convolution applicable on a second plurality (G2) of groups of the first intermediate information, such that G2 exceeds G1;

performing, by one or more third array convolution units of the building block being hardware convolution neural network units, a condensing group convolution on the second intermediate information, to provide third intermediate information, the group convolution applicable on a first plurality of groups of the second intermediate information; and performing, by one or more fourth array convolution units being hardware convolution neural network unit applied on the third intermediate information, anon-grouped convolution to provide output information, wherein a ratio between the second plurality of groups of the first intermediate information and the first plurality of groups of the input information differ from a ratio between the second number of features of the first intermediate information and the first number of features of the input information, wherein each convolution units of the first array convolution units, the second array convolution units, the third array convolution units and the fourth array convolution units differs from a one by one hardware convolution neural network unit, and wherein the building block is further executed by the neural network processor to perform max-pooling operations, such that the max-pooling operations are performed only after convolution operations.

* * * * *